No. 844,159. PATENTED FEB. 12, 1907.
E. LUDFORD.
SHEAVE BLOCK.
APPLICATION FILED MAY 22, 1906.
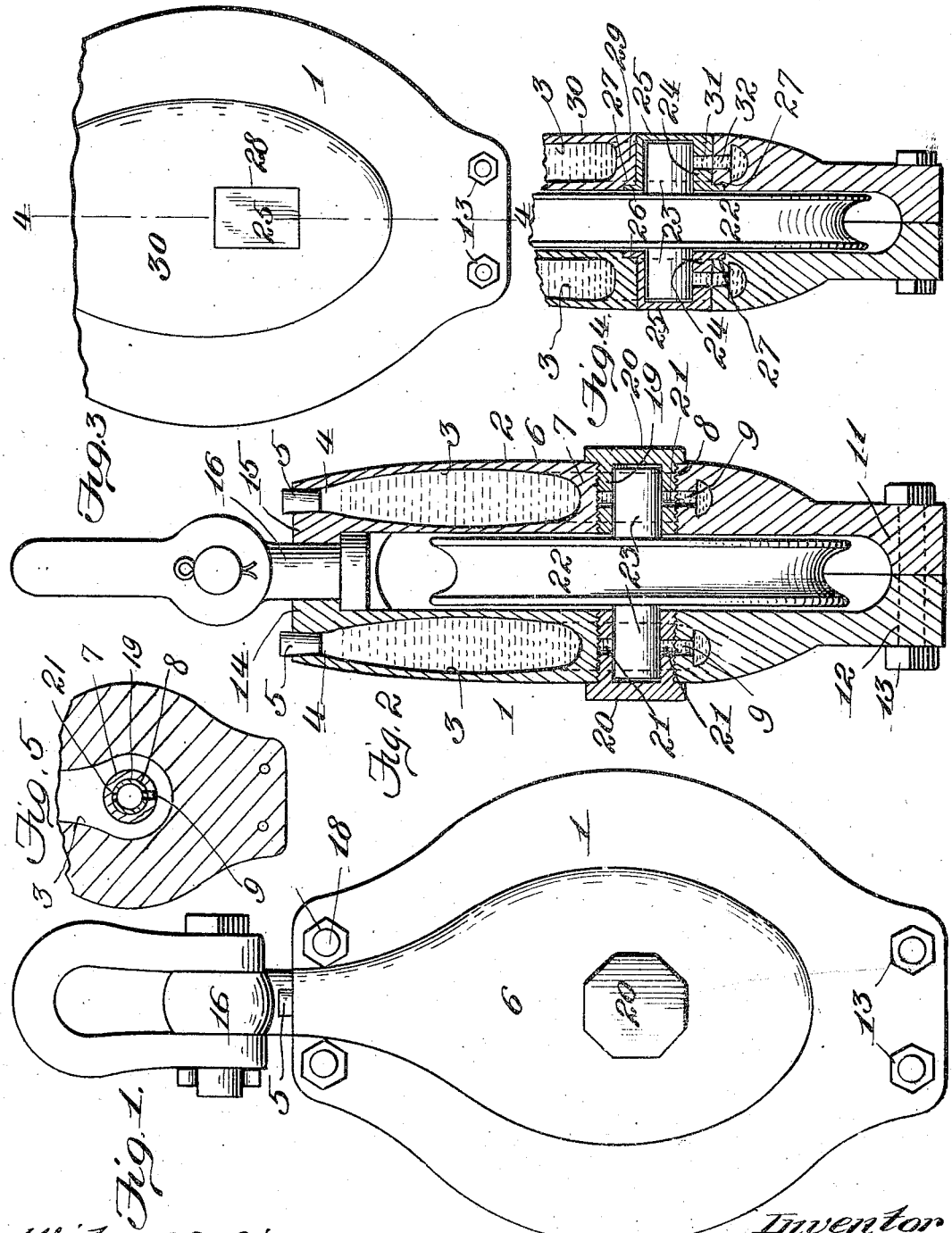
Witnesses:
Inventor
Enoch Ludford
By James L. Norris
Atty.

UNITED STATES PATENT OFFICE.

ENOCH LUDFORD, OF HICKORY, VIRGINIA.

SHEAVE-BLOCK.

No. 844,159.   Specification of Letters Patent.   Patented Feb. 12, 1907.

Application filed May 22, 1906. Serial No. 318,224.

*To all whom it may concern:*

Be it known that I, ENOCH LUDFORD, a citizen of the United States, residing at Hickory, in the county of Norfolk and State of Virginia, have invented new and useful Improvements in Sheave-Blocks, of which the following is a specification.

This invention relates to an improved sheave-block designed particularly for use to support cables of a log-haul.

Although the block is designed for use in log-hauling, yet the block is adapted for any purposes for which it may be found applicable.

The invention aims to provide a self-lubricating block in a manner as hereinafter set forth, so that the shaft of the sheave or pulley and its bearings will be automatically lubricated during the operation of the sheave or pulley, thereby increasing the durability of and overcoming the inconvenience of manually lubricating the said parts.

The invention further aims to construct the block so as to cause the automatic upward feed of the lubricant to the sheave or pulley shaft and its bearings during the operation of the sheave or pulley, such construction enabling the discontinuance of the feed of the lubricant when the sheave or pulley is idle.

The invention further aims to provide a block with adjustable bearings for the sheave or pulley shaft, said construction enabling each of the bearings to be turned or shifted, so that in case of the wearing of a portion of a bearing the other portion thereof can be utilized, thereby preventing the throwing away of the bearing until all the portions thereof have become worn, and by such construction it is evident that the durability of the bearings is increased.

The invention further aims to provide a self-lubricating sheave or pulley block which shall be simple in its construction, strong, durable, efficient in its use, and comparatively inexpensive to manufacture.

With the foregoing and other objects in view the invention consists of the novel construction, combination, and arrangement of parts hereinafter more specifically referred to, and illustrated in the accompanying drawings, wherein is shown the preferred embodiment of the invention; but it is to be understood that changes, variations, and modifications can be resorted to which come within the scope of the claims hereunto appended.

In describing the invention in detail reference is had to the accompanying drawings, in which—

Figure 1 is an elevation of a sheave-block in accordance with this invention. Fig. 2 is a vertical sectional view thereof. Fig. 3 is an elevation of a portion of the block, showing a modification. Fig. 4 is a section on line 4 4, Fig. 3. Fig. 5 is a sectional detail, on a reduced scale, through one of the pockets of Fig. 2.

Referring to the drawings by reference characters, the sheave-block in accordance with this invention comprises two side plates or cheeks 1 2, formed of suitable metallic material, and each of which is formed with a pocket 3, having its mouth 4 at the top of the plate and closed by a stopper 5.

The outer wall of the pocket 3, which is indicated by the reference character 6, is connected to the body of the plate by a circular wall 7, positioned at a point removed from the lower end of the pocket, so that the pocket 3 will extend around said circular wall. The circular wall 7 forms an opening which is a continuation of an opening 8, formed in the body of the plate, and the wall of said opening 8, as well as the wall 7, is provided with screw-threads. The pocket 3 constitutes a lubricant-reservoir, and the outlet thereof is formed by a port 9 in the lower portion of the circular wall 7, so that the discharge of the lubricant from the reservoir will be had in an upward direction when the shaft of the pulley, to be hereinafter referred to, is rotated.

When the plates 1 2 are set up in operative position, they are spaced apart at their bottoms through the medium of the spacing member 11, formed integral with the inner face of each of the plates at the lower end thereof, and the plates, as well as the spacing members, are provided with openings 12, through which extend the holdfast devices 13 for securing the lower ends of the plates 1 2 together. At the upper end of the plates 1 2 spacing members 14 15 are provided. Each of said members 14 15 is cut away to permit of connecting the shackle 16 to the sheave-block. The plates 1 2, as well as the spacing members 14 15, are provided with openings through which extend the holdfast devices 18 for securing the upper ends of the plates together.

Engaging the screw-threads of the wall 7 and opening 8 in each of the side plates is a hollow cylindrical screw-threaded bearing 19, closed at its outer end by the squared head 20, of greater diameter than the remaining portion of the bearing. Each of the bearings 19 is formed with a plurality of ports 21, as shown two in number, arranged diametrically opposite with respect to each other, and when the bearing is positioned one of the ports 21 is adapted to register with the port 9 through the wall 7; so that the lubricant will be fed through the said ports 9 and 21 from the reservoir into the interior of the bearing. The sheave or pulley (indicated by the reference character 22) is positioned between the side plates and carried by a shaft 23, which extends in the bearings 19.

When the sheave or pulley is operated, the action of the shaft 23 will tend to draw the lubricant from the reservoir through the ports 9 and 21, and consequently the ends of the shaft 23 will be lubricated. When the sheave or pulley is at rest, the end of the shaft 23 will close that port 21 which registers with the port 9, and consequently discontinues the feed of the lubricant. Therefore it is evident from such construction that when the pulley is operated the lubricant will be automatically fed to lubricate the shaft 23 and that when the sheave or pulley is at rest the shaft 23 will automatically discontinue the feed of the lubricant.

The providing of each of the bearings 19 with a plurality of diametrically-arranged ports 21 is to enable the feed of the lubricant when the bearings are adjusted, and in this connection it will be stated that if the lower portion of one of the bearings 19 becomes worn and the said bearing is turned or shifted the other port 21 will be brought into register with the port 9 to enable the lubricant to be fed in a manner as stated. The squared head 20 of the bearing enables the bearing to be adjusted by the use of a suitable tool or wrench.

In the modification shown in Figs. 3 and 4 the sheave-block is of the same construction as that referred to in connection with Figs. 1 and 2, with the exception that each of the bearings for the shaft 23 has a squared periphery. Consequently the outer wall of the pocket 3 is connected with the body of the plate by a square wall instead of a circular wall, as shown.

In Figs. 3 and 4 the reference character 24 denotes the bearings, each having a square periphery and closed at its outer end, as at 25, and having its inner end provided with a square flange 26, which is adapted to be seated in the countersunk portion 27, formed on the inner face of the side plate. The side plate is formed with a square opening 28, which is a continuation of the opening formed by the square wall 29, the latter connecting the outer wall 30 of the pocket with the body portion of the plate. The bearing is formed with a cylindrical opening to receive the end of the shaft 23. The bearing is furthermore provided with a port 31, which registers with the port 32, formed in the square wall 29. Otherwise than that as stated, the construction shown in Figs. 3 and 4 is the same as that shown in Figs. 1 and 2, the same reference characters being applied thereto.

Having thus fully described my invention, what I claim as new, and desire to secure by Letters Patent, is—

1. A sheave-block comprising a pair of side plates each formed with a pocket, the outer wall of the pocket being connected with the body portion of the plate by an inner wall at a point removed from the end of the pocket so as to cause the pocket to surround said inner wall, said inner wall having a port in its lower portion, a bearing mounted in each of the plates and surrounded by said inner wall, and each of said bearings having a port adapted to register with the port in the inner wall.

2. A sheave-block comprising a pair of side plates each provided with a pocket, the outer wall of said pocket connected with the body portion of the plate by an inner wall, said inner wall having its lower portion provided with a port, an adjustable bearing mounted in each of said plates and surrounded by said inner wall, each of said adjustable bearings provided with a plurality of ports, one of which is adapted to register with the port in said inner wall.

3. A sheave-block comprising a pair of side plates, each provided with a lubricant-reservoir, each of said reservoirs provided with an outlet for discharging the lubricant in an upward direction, and a bearing mounted in each of said plates and provided with a port adapted to register with the outlet of the reservoir.

4. A sheave-block comprising a pair of side plates, each provided with a lubricant-reservoir, each of said reservoirs provided with an outlet for discharging the lubricant in an upward direction, and an adjustable bearing mounted in each of said plates and provided with a plurality of ports, one of which is adapted to register with the outlet of the reservoir.

5. The combination with a pulley-shaft, of a pair of members, each provided with a lubricant-reservoir, each of said reservoirs provided with an outlet for discharging the lubricant in an upward direction, a bearing for each end of said shaft, said bearings mounted in said members and provided with ports adapted to register with the outlets of the reservoirs, said shaft adapted to close said ports when stationary.

6. The combination with a shaft and its pulley, of a sheave-block therefor, said block provided with means for automatically feeding a lubricant in an upward direction during the operation of said pulley, thereby lubricating said shaft, said shaft adapted to discontinue the discharge of said lubricant when the said shaft is stationary.

7. A sheave-block having a pair of adjustable bearings for the sheave-shaft, said block furthermore provided with a lubricant-reservoir, and said bearings provided with ports for establishing communication between the interior thereof and the reservoir.

8. A sheave-block provided with a plurality of lubricant-reservoirs, each having an inner and an outer wall, each of said inner walls having a port for discharging lubricant from said reservoirs in an upward direction, said block furthermore provided with a plurality of bearings for a sheave-shaft, each of said bearings provided with a port for establishing communication between the interior thereof and said reservoirs, thereby lubricating the sheave-shaft.

9. A sheave-block provided with a plurality of lubricant-reservoirs, each having an inner and an outer wall, each of said inner walls having a port for discharging the lubricant from said reservoirs in an upward direction, said block furthermore provided with a plurality of adjustable bearings for a sheave-shaft, said bearings provided with a plurality of ports, one of which is adapted to register with the outlet of the reservoirs, thereby establishing communication between the reservoirs and the interior of the bearings for lubricating the shaft.

In testimony whereof I have hereunto set my hand in presence of two subscribing witnesses.

ENOCH LUDFORD.

Witnesses:
W. P. JORDAN, Jr.,
JOHN L. LUDFORD.